United States Patent Office 3,126,952
Patented Mar. 31, 1964

3,126,952
WATERFLOODING METHOD
Loyd W. Jones, Tulsa, Okla., assignor to Pan American Petroleum Corporation, Tulsa, Okla., a corporation of Delaware
No Drawing. Filed Nov. 26, 1962, Ser. No. 240,150
18 Claims. (Cl. 166—9)

This invention relates to recovering oil from oil-bearing formations. More particularly it relates to a waterflooding process in which water is injected into at least one well penetrating the formation to force oil to flow to at least one other well from which the oil is produced.

Waterflooding has been used for many years. The process leaves considerable unrecovered oil in the formation. Many improvements to the process have been proposed to increase the recovery of oil and decrease the amount of unrecovered oil left behind. Among the proposed improvements is one in which a bank of oil containing a surface active agent is injected ahead of the flooding water. This batch of treated oil displaces the original oil efficiently by a miscible fluid drive. The water should then displace the treated oil more efficiently than it could displace the original oil because of the surface active agent in the treated oil. Tests have shown, however, that improved oil recovery does not always result. In fact, results are sometimes worse, as when an emulsion of water and oil forms due to the action of the surface active agent. Such an emulsion sometimes plugs a formation effectively, preventing the injection of water. In addition, many of the surface active agents are strongly adsorbed on the surfaces of the pores in the formation or are lost by solution in the water which follows the treated oil bank. Sometimes the treated oil becomes dispersed in separate droplets and is trapped in the pore spaces, permitting flooding water to move past it through the formation.

An object of this invention is to provide a waterflooding method which will recover an increased amount of oil over that which is generally recovered by waterflooding. A more specific object is to employ a waterflooding process of the type in which a bank of treated oil is injected in front of the water, this process avoiding at least some of the many difficulties which have been previously encountered with this process. A still more specific object is to provide a particular class of agents for treating a bank of oil which precedes the water in a waterflooding process, this class of agents providing increased oil recovery with fewer of the difficulties which sometimes occur in this process. Still further objects will be apparent from the following description and claims.

In general I have found that the objects of my invention can be accomplished by adding to a bank of oil which precedes the water in a waterflooding process a combination of an alcohol and a surface active agent. The alcohol and surface active agent appear to combine or associate to form a molecular aggregate which greatly changes the functions of the surface active agent in the waterflooding action.

The effects of the alcohol ordinarily appear in three ways. First, the adsorption of the surface active agent in solid surfaces is greatly decreased, thus indicating decreased activity at liquid-solid interfaces. This is one of the strongest indications that molecular aggregates are probably formed, with the surface active agent molecules oriented so their active portions are not exposed to the solid surfaces. Second, the interfacial tension between water and an oil solution of the alcohol and surface active agent is decreased to a value considerably lower than is obtainable by using either the alcohol or surface active agent alone. Here the combination action is very clear, but increased rather than decreased activity is indicated. Again, a reasonable explanation is that there is an association between the alcohol and surface active agent, resulting in a combination or aggregate with increased liquid-liquid activity even though the liquid-solid activity is apparently decreased as pointed out above. Third, the emulsifying ability of the surface active agent is modified. This modification generally appears as a decrease in emulsion forming tendency. This may seem somewhat surprising since the activity at the oil-water interface seems to be increased as far as interfacial tension is concerned. The answer probably is that while reduced interfacial tension and emulsion formation and stability are often closely related, other factors such as the shape of the surface active molecule, nature of active groups, and association with other molecules, whether other surface active molecules, alcohols, water or the like, also affect the formation and stability of emulsions. Further, the rigidity of films surrounding the dispersed emulsion phase determines emulsion stability to a large degree regardless of the interfacial tension level. The association of alcohols with surface active agents seems to be an example of cases in which the interfacial tension is decreased while at the same time the emulsifying tendency is usually also decreased.

A particularly desirable example of surface active agents for use in combination with alcohols is a mixture of petroleum sulfonates available under the trademark Sulfonate B. This is an oil-soluble mixture of sodium salts of petroleum sulfonates dissolved in oil. About 54 percent is sodium sulfonates, about 38 percent is oil, and the rest is salt water. The molecular weight of the sulfonates is about 480. The sulfonates in this molecular weight range tend to form water-in-oil emulsions, although those of only slightly lower molecular weight tend to form oil-in-water emulsions.

Two types of tests were made. In one a solution of the Sulfonate B in a petroleum fraction was successively diluted with more oil to form solutions containing various concentrations of the sulfonate. The interfacial tensions between these various solutions and 5 percent sodium chloride brine were then measured. In the other test various amounts of diatomaceous earth, a highly adsorptive siliceous material, were added to separate samples of a solution of Sulfonate B in oil. The diatomaceous earth was then filtered from the solutions and the interfacial tension of each solution against 5 percent sodium chloride brine was measured to determine how much of the Sulfonate B had been lost by adsorption. The same tests were also made using a combination of Sulfonate B with polypropylene glycol having an average molecular weight of about 1025. The first test was also repeated using only the polypropylene glycol without the Sulfonate B. The oil in every case was a narrow boiling petroleum fraction containing hydrocarbons having predominantly from about 10 to about 12 carbon atoms per molecule. This oil is usually referred to as $C_{10}$–$C_{12}$. Results of the dilution tests are reported in Table I.

Table I

| Concentration, percent | Interfacial Tension, dynes/cm. | | |
|---|---|---|---|
| | Sulfonate B | Sulfonate B plus PPG 1025* | PPG 1025* |
| 2.00 | | 0.7 | |
| 1.00 | 4.3 | 0.7 | 11.1 |
| 0.50 | 6.9 | 0.7 | 13.0 |
| 0.25 | 7.2 | | 15.3 |
| 0.20 | | 0.7 | |
| 0.10 | 12.6 | 0.8 | 17.0 |
| 0.05 | 14.7 | | 18.4 |
| 0.02 | | 2.8 | |
| 0.01 | 28.5 | | 20.4 |

*PPG 1025 is a mixture of polypropylene glycols having an average molecular weight of about 1025.

Two principal conclusions can be drawn from the data in Table I. First, it is apparent that the combination of the alcohol and surface active agent provides a remarkably greater reduction in interfacial tension than the same concentration of either constituent alone. Second, dilution of the solutions of surface active agent and alcohol alone had about the expected effect on interfacial tension. In the case of the combination, however, dilution had surprisingly little effect until very low concentrations were reached.

*Table II*

| Diatomaceous Earth, grams* | Interfacial Tension, dynes/cm. | |
|---|---|---|
| | Sulfonate B | Sulfonate B plus PPG 1025 |
| 0.1 | 5.5 | 0.5 |
| 0.2 | 10.5 | 0.5 |
| 0.5 | 10.2 | 0.5 |
| 1.0 | 7.0 | 0.5 |
| 5.0 | 11.0 | 0.6 |
| 10.0 | 11.9 | 0.8 |

*Grams per 100 milliliter of oil solution originally containing 1 percent Sulfonate B or 1 percent Sulfonate B plus 1 percent PPG 1025.

The principal point to be noted in these data is that even after contact with a large amount of the highly adsorptive diatomaceous earth, the combination of alcohol and surface active agent remained highly effective in reducing interfacial tension. It will be apparent, then, that the combination is not strongly adsorbed even on an unusually good adsorbent material. The lack of adsorption to solid surfaces has also been vertified by corrosion tests which show the combination of sulfonate and alcohol is not an effective inhibitor of metal loss whereas the sulfonate alone is.

The combination of Sulfonate B and polypropylene glycol also serves as a good example for showing the important effect of the alcohol on the emulsion forming ability of the surface active agent. A good test of emulsifying action is to shake an oil solution of the surface active agent, alcohol, or combination with an equal volume of water, and measure the time required for the emulsion to break. This test was performed using as the oil the $C_{10}$–$C_{12}$ fraction previously described, and using 1.5 percent Sulfonate B and 0.5 percent of the polypropylene glycol having a molecular weight of about 1025. The water phase contained about 5 percent sodium chloride. The test using equal amounts of oil and water gives a good measure of the tendency of the oil to emusify in water. A better test of the tendency of the water to emulisfy in the oil is provided by using 90 parts of the oil solution and only 10 parts of brine. Results of tests of both types are reported in Table III. In these tests the total amount of liquids was 100 milliliters in all cases. The liquids were placed in 250 milliliter separatory funnels and were shaken 50 strokes by hand.

*Table III*

| Additive | | Breakout Times, minutes | |
|---|---|---|---|
| Type | Concentration, percent | 50/50 Mix | 90/10 Mix |
| Sulfonate B | 5.0 | 105.0 | 60.0 |
| Sulfonate B plus PPG 1025* | 1.5 0.5 | 10.0 | 6.0 |
| PPG 1025* | 5.0 | 1.5 | 3.0 |

*PPG 1025 is polypropylene glycol with an average molecular weight of about 1025.

The significance of the data in Table III lies in its dissimilarity to that in Table I. In Table I the data show a strong increase in activity of the surface active agent and alcohol at the oil-water interface. In Table III, on the other hand, the data show a decrease in emulsifying tendency, an action which depends on activity of the agents at the oil-water interface. It will be apparent that the combination of surface active agent and alcohol increases the activity of the agents at the interface and thus facilitates recovery of oil with less energy. At the same time, the emulsifying tendency exhibited by most surface active agents is controlled to avoid the formation of troublesome emulsions.

The alcohol decreases the tendency of the surface active agent to be affected by dilution and adsorption, decreases the emulsifying tendency, and increases activity at the interface as indicated by the interfacial tension. All these theoretically should increase oil recovery from an oil-bearing formation in a process in which an oil bank containing the alcohol together with a surface active agent precedes the flooding water. This assumption was checked in a flow test. The test was run by a procedure used to test many agents. The procedure is as follows.

Lucite tubes with internal dimensions of 1½ inches in diameter and 52 inches long are packed with 50–70 mesh sand in the presence of water. Tight packing is assured by vibrating the sand and water slurry in the tube during addition of the sand. Weights are obtained each time on the empty tube, the tube filled with sand and water, and the quantity of dry sand placed in the tube. Knowing the density of the sand and water and the tube capacity, the volume of pore space (voids) is calculated. The packed column is mounted vertically and connected to a variable volume pump which transfers fluids from containers through a manifold system.

Untreated oil ($C_{10}$–$C_{12}$) is injected into the packed column at the top and displaced water is collected from the bottom. Oil injection is continued until the substantially irreducible minimum of trapped water content is reached. The amount of oil in place is calculated from the amount of water displaced and column weight determinations.

If the test is a control (untreated), water is then injected into the bottom of the tube and displaced oil is collected at the top. If a chemical is to be tested, the pure untreated oil in the column is displaced by more oil to which the chemical is added. The amount of treated oil injected is held in the range of 1.5 to 1.8 pore volume. Small amounts of additional water are usually displaced by the treated oil, and this is considered in figuring the amount of treated oil in place. The treated oil is introduced into the top of the column. The column is weighed and inverted. Water is then injected at the bottom and displaced oil is collected at the top. Injection of the driving water is made at a constant rate equivalent to a frontal advance of from about 15 to about 18 feet per day. Pressure drop across the core during floodout ranges from about 5 to 7 centimeters of mercury.

In a flow test using no additive, the percent oil recovery was 79.2 percent. When 1.5 percent Sulfonate B and 0.5 percent polypropylene glycol were added to the oil bank, however, oil recovery was 93.2 percent. Thus, the presence of the surface active agent and alcohol permitted recovery of two-thirds of the oil left by an ordinary waterflooding operation. Use of 5 percent Sulfonate B without the alcohol gave 86.1 percent of the oil. The surface active agent alone obviously improved oil recovery, but the combination with alcohol provided a much higher recovery.

Flow tests were made with Sulfonate B and various other alcohols. Other flow tests were made using other surface active agents. The results of these tests are presented in Table IV, together with results of screening tests such as interfacial tension tests and emulsifying tests. The emulsifying tests were made in the manner described in connection with Table III. Interfacial tension tests were all made with a DuNouy tensiometer. They were made in two ways. The first three were made by adding the surface active agent separately, the alcohol separately, and then the combination of the two to three samples of oil in the concentrations shown in Table IV and measuring the interfacial tensions of these solutions against 5 percent sodium chloride brine. The fourth and fifth tests were made by shaking an oil solution of the combination with an equal volume of 5 percent sodium chloride brine and then separating the two phases. The interfacial tension of the treated oil in contact with new brine and of the treated brine in contact with the new oil were then measured. The purpose was to determine how much of the activity was lost from the oil and gained by the water.

Tests 12 to 15 with commercial lecithin show the improved oil recovery which can be obtained by using a combination of this surface active agent with alcohol. It should be noted that lecithin is a rather strong emulsifying agent. Hexanol was not able to overcome this tendency completely. While the oil recovery was high, the pressure drop across the column was much higher than normal, and there were traces of emulsion in the effluent. The breakout times show that iso-octanol was more effective in overcoming the emulsion forming tendency of the lecithin and there were no emulsion troubles Table IV

| Test | Surface Active Agent | | Alcohol | | Interfacial Tension, dynes/cm. | | | | | Breakout Times, min. | | Percent Oil Recovery |
|---|---|---|---|---|---|---|---|---|---|---|---|---|
| | Type | Percent | Type | Percent | SAA* | Alc. | Comb. | TB* NO | TO* NB | 50/50 | 90/10 | |
| 1 | None | | None | | | | 45.0 | | | 0.3 | 1.0 | 79.2 |
| 2 | Sulfonate B | 5.00 | do | | 6.6 | | | 28.6 | 4.6 | 105.0 | 60.0 | 86.1 |
| 3 | None | | PPG 1025 | 5.00 | | 6.1 | | 10.1 | 7.6 | 1.5 | 3.0 | 79.0 |
| 4 | Sulfonate B | 1.50 | PPG 1025 | 0.50 | 7.8 | 13.3 | 0.8 | 11.2 | 0.6 | 10.0 | 6.0 | 93.2 |
| 5 | do | 0.75 | PPG 1025 | 0.25 | 9.0 | 14.0 | 0.9 | 12.7 | 0.5 | 9.0 | 7.0 | 89.7 |
| 6 | do | 3.75 | Iso-octanol | 1.25 | 7.1 | 24.5 | 0.7 | 19.6 | 1.0 | 6.0 | 3.0 | 92.5 |
| 7 | do | 2.50 | Hexanol | 2.50 | 7.6 | 16.5 | 1.0 | 20.0 | 0.7 | 7.0 | 5.0 | 94.4 |
| 8 | do | 1.50 | OX-126 | 0.50 | 7.8 | 0.2 | 1.5 | 21.9 | 1.4 | 14.0 | 7.0 | 93.5 |
| 9 | do | 1.50 | Phenol | 0.50 | 7.8 | 26.0 | 0.7 | 21.1 | 1.2 | 7.0 | 5.0 | 83.4 |
| 10 | do | 1.50 | Cyclohexanol | 0.50 | 7.8 | 25.0 | 0.6 | 20.1 | 1.8 | 12.0 | 4.0 | 84.0 |
| 11 | do | 2.50 | Hexyl Carbitol | 2.50 | 7.6 | 9.8 | 0.8 | 16.4 | 0.6 | 6.0 | 4.0 | 94.3 |
| 12 | Lecithin | 5.00 | None | | 13.5 | | | 24.4 | 14.9 | >360.0 | >360.0 | 84.8 |
| 13 | None | | Hexanol | 4.00 | | 15.0 | | 30.4 | 15.0 | 0.5 | 0.5 | 83.2 |
| 14 | Lecithin | 2.50 | do | 2.50 | 15.0 | 16.5 | 2.0 | 33.7 | 4.1 | 75.0 | 45.0 | 94.0 |
| 15 | do | 2.50 | Iso-octanol | 2.50 | 15.0 | 20.8 | 3.2 | 40.5 | 2.0 | 25.0 | 12.0 | 90.2 |
| 16 | Glyceryl Trioleate | 3.75 | Hexanol | 1.25 | 18.0 | 17.4 | 17.7 | 34.6 | 18.1 | 0.25 | 0.25 | 81.5 |
| 17 | Glyceryl Trioleate / Glyceryl Mono-oleate | 1.88 / 0.62 | do | 2.50 | 1.7 | 16.5 | 6.3 | 29.9 | 6.5 | 2.0 | 2.0 | 87.8 |
| 18 | Glyceryl Trioleate / Glyceryl Mono-oleate | 1.88 / 0.62 | Hexyl Carbitol | 2.50 | 1.7 | 9.8 | 1.5 | 16.5 | 1.5 | 25.0 | 3.0 | 90.0 |
| 19 | Glyceryl Trioleate / Glyceryl Mono-oleate | 2.12 / 0.38 | do | 2.50 | 1.6 | 9.8 | 1.2 | 15.6 | 2.0 | 4.0 | 2.0 | 91.0 |
| 20 | Corn Oil | 3.75 | PPG 1025 | 1.25 | 18.0 | 12.0 | 10.8 | 13.6 | 12.0 | 0.25 | 0.25 | 83.4 |
| 21 | Sulfonate AA | 5.00 | None | | 1.0 | | | 17.5 | 0.6 | 75.0 | 9.0 | 77.0 |
| 22 | do | 2.50 | Iso-octanol | 2.50 | 1.6 | 20.8 | 0.7 | 6.3 | 1.5 | 5.0 | 3.0 | 86.7 |
| 23 | do | 1.50 | PPG 1025 | 0.50 | 1.3 | 13.3 | 0.6 | 9.6 | 0.2 | 480.0 | 20.0 | 81.5 |
| 24 | do | 1.00 | Cresylic Acids | 1.00 | 1.8 | 20.8 | 0.7 | 6.9 | 0.5 | 180.0 | 15.0 | 87.0 |

*Notes:
TB NO means treated brine with new oil.
TO NB means treated oil with new brine.
SAA means surface active agent.

In the table, Sulfonate B is the petroleum sulfonate previously described. Sulfonate AA is another petroleum sulfonate with a slightly lower average molecular weight, about 425 compared to about 480 for Sulfonate B. Because of the lower molecular weight, the Sulfonate AA tends to form oil-in-water emulsions. PPG 1025 is polypropylene glycol having a molecular weight of about 1025. The lecithin was commercial lecithin containing about one-third lecithins, about one-third other phosphatides, and about one-third soy oil. The cresylic acids were a natural mixture obtained from coal tar. OX-126 is nonylphenol ethoxylated with 4 moles of ethylene oxide per mole of nonylphenol. All other materials are adequately defined in the table.

Tests 1, 2, and 4 are previously discussed and are included for comparison. Test 3 shows that the polypropylene glycol alone reduced interfacial tension somewhat, but had little beneficial action on oil recovery. The reason may be partly due to loss of activity to the water, and partly due to insufficient interfacial tension reduction. Interfacial tension measurements in Test 4 show clearly the combination effect of the Sulfonate B and polypropylene glycol on interfacial tension. The breakout times in Test 4 compared to those in Tests 2 and 3 show the reduced emulsion forming and stabilizing tendency of the combination. The remainder of tests with Sulfonate B show the abilities of various other alcohols to give combination actions of various degrees with this surface active agent. The lower recoveries with cyclohexanol and phenol are probably due to loss of these materials to the water phase even in the presence of the Sulfonate B. Some evidence of this is apparent from the interfacial tension measurements. It would seem, therefore, that these alcohols are close to the upper limit of water solubility.

in the flow tests. It will be apparent that the interfacial tension and emulsion tests can be used with advantage as screening tests to determine the best surface active agents, alcohols, concentrations, and ratios to use.

Tests 16 to 19 also show that the screening tests can be used to determine the proper alcohol to use with a surface active agent or mixture of agents and the proper ratio of agent to alcohol. Test 16 shows that glyceryl trioleate is a very weak surface active agent with little ability to increase oil recovery. By mixing a little glyceryl mono-oleate with the trioleate to increase its activity and by carefully selecting the alcohol and ratio of alcohol to oleates, the surface active agent can obviously be made to provide greatly increased oil recovery. It should be noted in this regard that neither the monoleate with alcohol nor several other ratios of trioleate to mono-oleate or ratios of oleates to alcohol produced as good results. Some were little better than the trioleate alone. The screening tests, particularly the breakout times, generally gave a good indication of the inferiority of the poor mixtures, again demonstrating the usefulness of the screening tests in selecting the best agents, alcohols, and combinations.

Test 20 is typical of the natural glyceride oils. The results are obviously poor compared to results with materials such as lecithin and Sulfonate B. As shown in Tests 17, 18, and 19, however, it should be possible to blend the natural oils with more active agents to obtain better results.

Tests 21 to 24 with Sulfonate AA show the rather poor results with this material in spite of the similarity to Sulfonate B. The screening tests show these poor results to be due principally to too great a tendency to form oil-in-water emulsions and excessive loss of activity from the oil phase to the water phase. The results are typical of materials with too great a tendency to emulsify oil in water. Actually, the Sulfonate AA is on the border line of being satisfactory. Most water-soluble agents are even worse.

The data in Table IV have been presented principally to show how the screening tests can be used to aid in selecting the best combinations, concentrations, and ratios for good oil recovery rather than as limitations on any of these factors. My invention lies broadly in the use of oil-soluble alcohols with oil-soluble surface active agents in an oil bank preceding the flooding water in a water drive operation. Some limitations are necessary, however. The surface active agent and alcohol must, of course, be sufficiently soluble in oil to establish the desired concentration in the presence of the other member of the combination. The surface active agent and alcohol should be substantially water-insoluble to avoid excessive loss from the oil bank to the water phase as the bank progresses through the formation. This requirement is more important for the alcohol than for the surface active agent. Water-soluble alcohols do not seem to form completely appropriate associations with the surface active agents. The association of oil-soluble alcohols with somewhat water-soluble surface active agents seem to exhibit combination effects, the principal objection being loss of the combination to the water phase. The combination frequently is not as water-soluble as the surface active agent alone. In addition, there are occasions, such as when the main problem is removal of oil from around injection wells to increase water injectivity, where loss of the combination after a short time is not objectionable.

The combination must not cause the dispersion of oil droplets into the water to avoid excessive by-passing of discontinuous droplets of oil. The combination must apparently have at least some tendency to emulsify water into oil, although this requirement may be principally another way of expressing the necessity that oil must not be dispersed in water but must continue to exist as a continuous phase even in a system which contains much water and little oil.

Theoretically, as the treated oil bank moves through the reservoir, substantially all the oil previously in the reservoir is displaced ahead of the bank. This is by a miscible fluid displacement operation. As the water forces the treated oil bank through the reservoir, there is, no doubt, a mixing zone. In the leading edge of this mixing zone the liquids are mostly oil with little water. Near the trailing edge there is much water and little oil. The breakout tests seem to indicate that an ability of the additives to disperse the water into the oil at the interface is important. It is even more important that near the trailing edge of the mixing zone the oil should remain in continuous phase to as low an oil concentration as possible. This continuous oil phase provides flow paths through which displaced oil can flow ahead of the flooding water. As soon as the oil phase becomes discontinuous, however, the remaining oil becomes isolated and is by-passed by the water. This would seem to explain why some tendency to form a discontinuous water phase in a continuous oil phase seems to be necessary. I do not, however, wish to be bound by this theory. An excessive tendency to emulsify water in oil is, of course, undesirable to avoid plugging the formation pores with a permanent emulsion. Surface active agents bound permanently in emulsions do no move readily through rock to improve oil displacement.

The concentrations of surface active agents and alcohols and the ratios of these two materials vary widely, depending upon which agents and alcohols are used. The screening tests can be used to select materials, concentrations, and ratios which seem best for the particular oil and water to be used. In general, the materials should show a combination interfacial tension lowering effect and should be used in a concentration and ratio to produce an interfacial tension less than about 5 dynes per centimeter and preferably less than about 1 dyne per centimeter. An interfacial tension less than about 0.1 or 0.2 dynes per centimeter should not usually be used, the reason being that at very low interfacial tensions the surface films which maintain continuous oil flow paths can be too easily broken, leaving excessive amounts of oil isolated in the formation. In the emulsifying tests, the 50/50 mix should have a breakout time of not more than about an hour and preferably no more than about 10 minutes. The 90/10 mix should have a breakout time of not more than about an hour and at least about 2 or 3 minutes, preferably from about 5 to about 10 minutes.

Best results are usually obtained by using a ratio of surface active agent to alcohol between about 3 to 1 and about 1 to 3. The concentration of the combination for best results should usually be between about 1 percent and 5 percent by weight of the oil. The concentration near the leading edge of the oil bank should preferably be higher than that near the trailing edge.

The nature of the oil and the nature and concentration of salts in the flooding water can also influence the action of the combination of surface active agent and alcohol. Therefore, the screening tests should be made using the oil to be employed in the oil bank and the water with which it will be in contact. This is particularly true if crude petroleum oil is used for the oil bank. Most crude oils contain at least a small amount of surface active agents. Some seem to contain agents with the properties of alcohols. In such cases the types and certainly the ratio of the added surface active agents and alcohols should take into account the amounts and types of these materials already present in the crude oil. In some cases it may be necessary to add only the surface active agent or only the alcohol to the crude oil to obtain the desired effect.

When a single material is added, there is sometimes a question whether the effect which is observed is the effect of the added material alone or of the combination of this material with another active material naturally present in the crude oil. This question can be answered by introducing the same quantity of the additive into a distilled petroleum fraction having about the same viscosity as the crude oil. If the effects on interfacial tension, emulsifying action and the like, are about the same in the distilled petroleum fraction as in the crude oil, it will be apparent that the effects are those of the single additive. If the results are substantially better in the case of the crude oil, however, it will be apparent that there is a combination action between the additive and a natural active ingredient of the crude oil.

If the crude oil contains insufficient natural active materials, the oil may be treated to increase the content of active agents. For example, the crude oil may be subjected to sulfonation with sulfuric acid, oxidation by air blowing, or the like. Still other treatments such as adding sodium hydroxide, lime, or the like, to form salts of free acids will occur to those skilled in the art.

The crude oil may be either from the same field, or may be brought in from other fields and used because of particularly desirable properties. The oil may also be of various other types such as gasoline or liquefied petroleum gases. These have the advantage of low viscosity. In addition, the volatile liquefied petroleum gas can be recovered, if desired, at the end of the flood, by dropping the reservoir pressure to a point below the vapor pressure of this oil at reservoir temperature.

In screening tests the water should be at least similar to that which will be in contact with the treated oil bank in the formation. Immediately after the oil bank has been injected and injection of flooding water starts, the flooding water will be in contact with the oil bank. As the flooding water moves through the reservoir, however, it displaces ahead of it the water already present in the formation. At least a portion of this in-place water will soon collect between the treated oil bank and the flooding water. The result will be that the oil bank is displaced by a bank of connate water, which in turn is displaced by the flooding water. Thus, the water in contact with the oil bank will soon be formation connate water rather than the flooding water. In screening tests it may be more significant, for this reason, to use water more similar to the connate water than the flooding water.

It is often possible to obtain particularly desirable results by displacing the treated oil bank with water having a particular composition. For example, the water may contain various amounts of sodium chloride, special additives such as the phosphates, carbonates, silicates, or the like, or acids or bases to adjust the pH. In such cases, it is important to avoid having a bank of naturally occurring water in the formation collect between the treated oil bank and the flooding water. The collection of such a bank of natural water can be avoided by a variation in the flooding process. In this variation, a bank of the flooding water is injected ahead of the oil bank. This leading batch of flooding water displaces the naturally occurring formation water. Then, when the oil bank is injected and is followed by the flooding water, any water which collects behind the oil bank will have the same composition as the flooding water rather than the composition of the naturally occurring water in the formation.

If connate water is not to accumulate between the flooding water and the treated oil bank, the volume of flooding water preceding the treated oil bank should be approximately equal to the irreducible minimum saturation of water in the flooded portion of the reservoir. This ordinarily means that the amount of water injected before the treated oil bank should be about 20 or 30 percent of the flooded pore volume. The advantages of selecting a particular flooding water composition are frequently insufficient to justify the injection of such a large volume of flooding water before the treated oil bank. It may, however, be considered worth while to inject a somewhat smaller volume of flooding water ahead of the treated oil, realizing that the effects will not extend completely through the reservoir.

The quantity of oil used in the oil bank should theoretically be equal to the amount of residual oil left in the flooded portion of the reservoir at the end of the flooding process. This amount may vary from about 5 to as much as 30 percent, or even more, of the flooded pore volume. Some advantages can be obtained by the use of even less than about 5 percent of the pore volume. Even if the treated oil bank does not travel the entire distance to the producing well, a part of the reservoir will be affected, with an accompanying increase in oil recovery. In addition, one of the principal problems may be to remove a very high proportion of the oil from near the injection well to increase water injection rates. In this case a small batch of treated oil, possibly only a few barrels, may be injected.

Many variations in my process are possible. For example, my process is well adapted to be used after an ordinary waterflooding operation has been completed. The oil bank re-establishes continuous flow channels for the oil phase. This permits recovery of high percentages of the remaining oil by my process, even though the original waterflooding operation may have caused the oil phase to become discontinuous. Still other variations falling within the limitations of the following claims will be apparent to those skilled in the art.

I claim:

1. A method for the recovery of oil from an oil-bearing earth formation penetrated by at least one injection well and at least one producing well comprising introducing into said at least one injection well and into said oil-bearing formation an oil solution containing an oil-soluble surface active agent capable of emulsifying water in oil and an oil-soluble, substantially water-insoluble, alcohol in an amount sufficient to modify the effects of said surface active agent, then injecting flooding water into said at least one injection well and into said formation to cause said oil solution to flow through said formation and recovering oil from said at least one producing well.

2. The method of claim 1 in which the weight ratio of said surface active agent to said alcohol is from about 1 to 3 to about 3 to 1, and the concentration of the combination of surface active agent and alcohol in said oil solution is from about 1 to about 5 percent by weight of said oil solution.

3. The method of claim 1 in which the amounts of said surface active agent and said alcohol in said oil solution are within a range sufficient to establish an interfacial tension between said oil solution and said flooding water between about 0.1 and about 5.0 dynes per centimeter, and said amounts are also sufficient to provide a water-in-oil emulsion stability of between about 2 and about 60 minutes and an oil-in-water emulsion stability of less than about 60 minutes.

4. The method of claim 1 in which said surface active agent is a mixture of sodium salts of petroleum sulfonates having an average molecular weight of about 480 and said alcohol is selected from the group consisting of hexanol, iso-octanol, hexyl carbitol, and mixed polypropylene glycols having an average molecular weight of about 1025.

5. The method of claim 3 in which said oil solution is preceded by water having substantially the same composition as the flooding water which follows said oil solution.

6. An improved method for recovering oil from a permeable, solid, oil-containing material comprising introducing into said material an oil solution containing an oil-soluble surface active agent capable of emulsifying water in oil and an oil-soluble, substantially water-insoluble alcohol, in an amount sufficient to modify the effects of said surface active agent, said oil solution serving to remove the original oil from said material, and then introducing water into said material to displace said oil solution from said material.

7. The method of claim 6 in which the weight ratio of said surface active agent to said alcohol is from about 1 to 3 to about 3 to 1, and the concentration of the concentration of the combination of surface active agent and alcohol in said oil solution is from about 1 to about 5 percent by weight of said oil solution.

8. The method of claim 6 in which the amounts of said surface active agent and said alcohol in said oil solution are within a range sufficient to establish an interfacial tension between said oil solution and said water between about 0.1 and about 5.0 dynes per centimeter, and said amounts are also sufficient to provide a water-in-oil emulsion stability of between about 2 and about 60 minutes and an oil-in-water emulsion stability of less than about 60 minutes.

9. The method of claim 6 in which said surface active agent is a mixture of sodium salts of petroleum sulfonates having an average molecular weight of about 480 and said alcohol is selected from the group consisting of hexanol, iso-octanol, hexyl carbitol, and mixed polypropylene glycols having an average molecular weight of about 1025.

10. The method of claim 6 in which said oil solution is preceded by water having substantially the same composition as the water which follows said oil solution.

11. In a method for waterflooding an underground oil-bearing formation, in which method a bank of oil containing a surface active agent is injected into said formation ahead of the flooding water, the improvement comprising using as said surface active agent one which is oil-soluble and which forms water-in-oil emulsions and introducing into said bank of oil before it is injected into said formation an oil-soluble, substantially water-insoluble alcohol, in an amount sufficient to modify the effects of said surface active agent.

12. The method of claim 11 in which the weight ratio of said surface active agent to said alcohol is from about 1 to 3 to about 3 to 1, and the concentration of the combination of surface active agent and alcohol in said oil is from about 1 to about 5 percent by weight of said oil.

13. The method of claim 11 in which the amounts of said surface active agent and said alcohol in said oil are within a range sufficient to establish an interfacial tension between said oil and said flooding water between about 0.1 and about 5.0 dynes per centimeter, and said amounts and ratio are also sufficient to provide a water-in-oil emulsion stability of between about 2 and about 60 minutes and an oil-in-water emulsion stability of less than about 60 minutes.

14. The method of claim 11 in which said surface active agent is a mixture of sodium salts of petroleum sulfonates having an average molecular weight of about 480 and said alcohol is selected from the group consisting of hexanol, iso-octanol, hexyl carbitol and mixed polypropylene glycols having an average molecular weight of about 1025.

15. The method of claim 11 in which said oil bank is preceded by water having substantially the same composition as the flooding water which follows said oil bank.

16. A method for the recovery of oil from an oil-bearing earth formation penetrated by at least one injection well and at least one producing well comprising sulfonating a volume of crude oil, adding to the sulfonated crude oil a quantity of an oil-soluble, substantially water-insoluble, alcohol sufficient to modify the effects of the sulfonates in said sulfonated crude oil, introducing said sulfonated oil, containing said alcohol, into said at least one injection well and into said oil-bearing formation to displace the original oil from said formation, then injecting flooding water into said at least one injection well and into said formation to displace said sulfonated crude oil, containing said alcohol, from said formation, and recovering oil from said at least one producing well.

17. The method of claim 16 in which the degree of sulfonation and the amount of said alcohol are sufficient to establish an interfacial tension between said sulfonated crude oil, containing said alcohol, and said flooding water between about 0.1 and about 5.0 dynes per centimeter, and said degree of sulfonation and amount of said alcohol are also sufficient to provide a water-in-oil emulsion stability of between about 2 and about 60 minutes and an oil-in-water emulsion stability of less than about 60 minutes.

18. The method of claim 16 in which said sulfonated crude oil, containing said alcohol, is preceded by water having substantially the same composition as the flooding water which follows said oil.

References Cited in the file of this patent
UNITED STATES PATENTS

| | | |
|---|---|---|
| 2,851,105 | Garst | Sept. 9, 1958 |
| 2,875,831 | Martin | Mar. 3, 1959 |
| 3,082,822 | Holm | Mar. 26, 1963 |